(12) United States Patent
Takayasu et al.

(10) Patent No.: US 8,383,944 B2
(45) Date of Patent: Feb. 26, 2013

(54) METAL FITTING INTEGRATION TYPE STRESS-RELIEF CONE AND A CABLE SEALING END USING THE SAME

(75) Inventors: Hisaya Takayasu, Tokyo (JP); Nobuyuki Sema, Tokyo (JP)

(73) Assignee: SWCC Showa Cable Systems Co., Ltd. (JP)

( * ) Notice: Subject to any disclaimer, the term of this patent is extended or adjusted under 35 U.S.C. 154(b) by 292 days.

(21) Appl. No.: 12/674,753

(22) PCT Filed: Sep. 22, 2008

(86) PCT No.: PCT/JP2008/002619
§ 371 (c)(1),
(2), (4) Date: Feb. 23, 2010

(87) PCT Pub. No.: WO2009/041013
PCT Pub. Date: Apr. 2, 2009

(65) Prior Publication Data
US 2011/0114358 A1    May 19, 2011

(30) Foreign Application Priority Data

Sep. 26, 2007  (JP) ................................. 2007-249431
Sep. 12, 2008  (JP) ................................. 2008-234084

(51) Int. Cl.
*H02G 15/00* (2006.01)
*H01B 17/26* (2006.01)
*H01B 17/28* (2006.01)
*H05K 5/00* (2006.01)

(52) U.S. Cl. ........ 174/73.1; 174/142; 174/18; 174/31 R; 174/140 R; 174/12 BH; 361/117

(58) Field of Classification Search .................. 174/142, 174/137 R, 140 R, 140 CR, 145, 73.1, 80, 174/81, 74 R, 14 R, 14 C, 14 CR, 102 SC, 174/105 SC, 106 SC, 110 SC, 11 S, 73 SC, 174/128.1, 128.2, 128 F, 152 G, 152 R, 153 G, 174/209, 75 R, 75 D, 135, 144, 141 R, 140 H, 174/11 BH, 12 BH, 19, 127, 14 BH, 143, 174/650, 18, 77 R, 76, DIG. 8, 31 R; 385/138; 337/202; 428/389, 416, 418, 450, 463; 423/622; 523/459; 524/432; 264/230; 16/2.1, 2.2; 336/174, 70, 94; 248/56; 439/604, 587, 439/274, 275

See application file for complete search history.

(56) References Cited

U.S. PATENT DOCUMENTS

| | | | | |
|---|---|---|---|---|
| 4,214,119 A | * | 7/1980 | Keen, Jr. ..................... | 174/31 R |
| 5,088,001 A | * | 2/1992 | Yaworski et al. ............. | 361/127 |
| 5,130,495 A | * | 7/1992 | Thompson ................... | 174/73.1 |

FOREIGN PATENT DOCUMENTS

| | | |
|---|---|---|
| JP | 04193018 | 7/1992 |
| JP | 07015855 | 1/1995 |
| JP | 2002017035 | 1/2002 |

*Primary Examiner* — Zachary M Pape
*Assistant Examiner* — Binh Tran
(74) *Attorney, Agent, or Firm* — Bacon & Thomas, PLLC

(57) ABSTRACT

A metal fitting integration type stress-relief cone is provided with a stress-relief cone which includes a cylindrical rubber-like elastic body on an outer circumference of a cable core and a metal fitting which surrounds the cable core and is integral with a low-voltage side of the stress-relief cone. The stress-relief cone is provided with a cylindrical semi-conducting body part at the low-voltage side and has a bell-mouthed electric-field stress-control part in an end of a high-voltage side, an insulating body part on the high-voltage side with a low-voltage side end concentric with the semi-conducting body part and a cylindrical insulation protective layer which is arranged continuously at the end of the low-voltage side of the insulating body part and is integral with the outer circumference of the semi-conducting body part.

8 Claims, 3 Drawing Sheets

METAL FITTING INTEGRATION TYPE STRESS-RELIEF CONE AND A CABLE SEALING END USING THE SAME

TECHNICAL FIELD

This invention relates to a metal fitting integration type stress-relief cone and a cable sealing end using the metal fitting integration type stress-relief cone. Particularly, it relates to the metal fitting integration type stress-relief cone which can reduce the number of components and considerably improve the sealing characteristic of the sealing part (oil-stopping part), and relates to the cable sealing end using the metal fitting integration type stress-relief cone.

BACKGROUND ART

Heretofore, as this kind of the cable sealing end, (1) the thing which fixes an epoxy unit in the inside of a base of a porcelain bushing and installs a molded rubber stress-relief cone to the aforementioned epoxy unit (for example, refer to Patent document No. 1), or (2) the thing which controls the electric field by the molded rubber stress-relief cone itself without providing the above-mentioned epoxy unit (for example, refer to Patent document No. 2) are known.

However, in the cable sealing end of (1), although the decision of the position of the molded rubber stress-relief cone can be performed easily, because the predefined interfacial pressure must be given to the interface between the molded rubber stress-relief cone and the epoxy unit, there is a difficult point which must arrange the pressure device having such as the relatively-large spring unit in the neighborhood of the molded rubber stress-relief cone. And, in the cable sealing end of (2), although it is not necessary to arrange the above-mentioned pressure device, because it is necessary to seal the insulating oil in the inside of the porcelain bushing by the metal fitting or the tape which are used only for oil-stopping, the reliability of the sealing part (oil-stopping part) is apprehended as shown in next.

First, the structure of the sealing part (oil-stopping part) such as the tape by the construction at the site has the influence on the airtightness by skill of the worker.

Second, because it is necessary to provide the component such as the metal fitting which are used only for oil-stopping, and because the operation of winding of the sealing tape is necessary, the structure becomes complex and also the workability deteriorates.

Third, when the insulating oil which is filled in the inside of the porcelain bushing contacts to a semi-conducting body part of the molded rubber stress-relief cone, there is a possibility that the physical property of the semi-conducting body part is influenced.

Patent document No. 1: Patent publication number H04-193018

Patent document No. 2: Patent publication number 2007-159271

DISCLOSURE OF THE INVENTION

Problem to be Solved by the Invention

This invention was performed to solve the aforementioned difficult points. This invention has a purpose to provide the metal fitting integration type stress-relief cone which can considerably improve the sealing characteristic of the sealing part (oil-stopping part) by integrating the stress-relief cone and the metal fitting and by using an O-ring to a sealing surface. And this invention has a purpose to provide the cable sealing end using the metal fitting integration type stress-relief cone.

Means for Solving the Problems

The metal fitting integration type stress-relief cone as first feature of this invention is provided with a stress-relief cone which is installed at an outer circumference of a cable core and consists of a rubber-like elastic body and a metal fitting which surrounds the cable core and is provided integrally at a low-voltage side of the stress-relief cone, and the stress-relief cone is provided with a cylindrical semi-conducting body part which is arranged at the low-voltage side and has a bell-mouthed electric-field stress-control part at an end of a high-voltage side, a cylindrical insulating body part which is arranged at the high-voltage side and whose end of the low-voltage side is provided continuously at the electric-field stress-control part and concentrically to the semi-conducting body part, a cylindrical insulation protective layer which is provided continuously at the end of the low-voltage side of the insulating body part and provided integrally at the outer circumference of the semi-conducting body part, and a cylindrical semi-conducting skirt part is protruded, and provided toward the low-voltage side at an outer edge of the end of the low-voltage side of the semi-conducting body part, and an insulating skirt part is protruded and provided toward the low-voltage side at the end of the low-voltage side of the insulation protective layer, and the metal fitting is provided with a first cylindrical part whose outer circumference part adheres tightly to an inner circumference part of the semi-conducting skirt part, a second cylindrical part which is provided concentrically and continuously to the low-voltage side of the first cylindrical part and whose outer circumference part adheres tightly to the inner circumference part of the insulating skirt part, and a third cylindrical part which is provided concentrically and continuously to the low-voltage side of the second cylindrical part.

As for second feature of this invention, in the metal fitting integration type stress-relief cone as first feature, an annular protrusion is provided at an inner circumference of the end of the low-voltage side of the insulating skirt part, and an annular concave groove which engages with the protrusion is provided at the end of the low-voltage side of the second cylindrical part.

As for third feature of this invention, in the metal fitting integration type stress-relief cone as first feature or second feature, a depressed part is provided concentrically to the insulating body part at an inner edge of the end of the high-voltage side of the insulating body part.

A cable sealing end as fourth feature of this invention is provided with a cable termination whose cable core is exposed by a step-stripped process, a porcelain bushing which surrounds the cable termination, an insulating fluid which is filled in the inside of the porcelain bushing, and a metal fitting integration type stress-relief cone according to any one of features 1 to 3, and the metal fitting integration type stress-relief cone installs the metal fitting of the metal fitting integration type stress-relief cone toward a lower metal fitting of the porcelain bushing at an outer circumference of the cable core, and the metal fitting is fixed to the lower metal fitting through an O-ring.

EFFECT OF THE INVENTION

According to the metal fitting integration type stress-relief cone of third feature from first feature of this invention, there are following effects.

First, by providing integrally the metal fitting at the low voltage side of the stress-relief cone comprising the rubber-like elastic body, the O-ring can be arranged at the sealing surface. Therefore, the sealing part (oil-stopping part) can be formed easily without using the metal fitting or the sealing tape which are used only for oil-stopping as before.

Second, by providing integrally the cylindrical insulation protective layer at the outer circumference of the semi-conducting body part of the stress-relief cone, the insulating oil which is filled in the inside of the porcelain bushing does not contact to the semi-conducting body part of the stress-relief cone. Therefore, there is not a fear that the physical property of the semi-conducting body part is influenced.

Third, by providing the depressed part at the inner edge of the end of the high-voltage side of the insulating body part of the stress-relief cone, the electric-field concentration in the triple junction which are the insulating fluid in the end of the high-voltage side of the stress-relief cone, the insulating body part of the stress-relief cone, and the cable insulator of the cable core can be prevented.

Fourth, by protruding and providing the semi-conducting skirt part and the insulating skirt part at the low-voltage side of the stress-relief cone, and by providing the cylindrical part in the metal fitting, the metal fitting and the stress-relief cone can be integrated strongly.

Fifth, by providing the annular protrusion at the inner circumference of the end of the low-voltage side of the insulating skirt part which constructs the stress-relief cone, and by providing the annular concave groove which engages with the aforementioned protrusion at the end of the low-voltage side of the second cylindrical part which constructs the metal fitting, the metal fitting and the stress-relief cone can be integrated more strongly. Concretely, by this constitution, in the case of not only the integration of the stress-relief cone and the metal fitting by molding but also the integration of the stress-relief cone and the metal fitting by expanding the diameter of the stress-relief cone and installing to the metal fitting at the construction site, the stress-relief cone and the metal fitting can be integrated more strongly.

Besides, according to the cable sealing end of fourth feature of this invention, there are following effects.

First, by installing the metal fitting of the metal fitting integration type stress-relief cone toward the lower metal fitting side, and by fixing the aforementioned metal fitting to the lower metal fitting through the O-ring, it is possible to reduce the number of the components than the hitherto known sealing part (oil-stopping part), and it is possible to considerably improve the sealing characteristic of the sealing part (oil-stopping part).

Second, it is not necessary to use the metal fitting or the tape seal which are used only for the oil-sealing as before, and the skill of the worker is not necessary. Therefore, there is not the dispersion of the airtightness in the sealing part, and the simplification of the assembling can be attempted.

Third, by the construction of the sealing by the O-ring, the reliability of the sealing part can be considerably improved.

Figure 1:
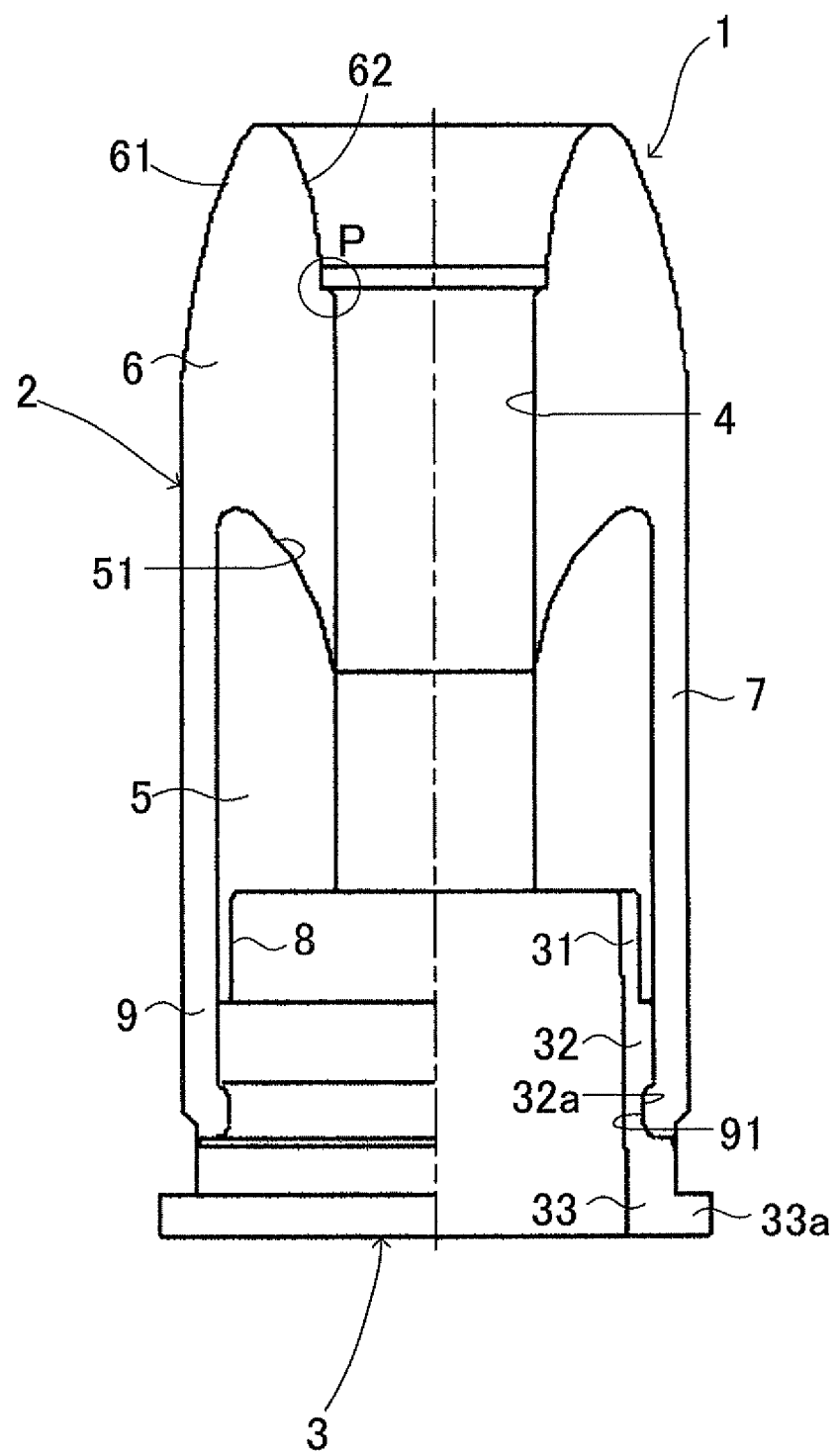
FIG. 1 The partial sectional view of the metal fitting integration type stress-relief cone in this invention.

EXPLANATION OF THE NUMERALS 1 metal fitting integration type stress-relief cone
2 stress-relief cone
3 metal fitting
31 first cylindrical part
32 second cylindrical part
33 third cylindrical part
5 semi-conducting body part
51 electric-field stress-control part
6 insulating body part
62 depressed part
7 insulation protective layer
8 semi-conducting skirt part
9 insulating skirt part
11 cable core
12 cable termination
13 lower metal fitting
15 insulating fluid
17 O-ring

BEST MODE FOR CARRYING OUT THE INVENTION

Hereinafter, preferred embodiments of the metal fitting integration type stress-relief cone and the cable sealing end using the metal fitting integration type stress-relief cone of this invention are explained with reference to the drawings. Meanwhile, the high-voltage side corresponds to the upper direction in the drawing, and the low-voltage side corresponds to the lower direction in the drawing.

[Embodiment 1]

FIG. 1 shows the partial sectional view of the metal fitting integration type stress-relief cone of this invention which is suitable to the indoor/outdoor termination of 110 kV class.

In this drawing, the metal fitting integration type stress-relief cone 1 of this invention is provided with the stress-relief cone 2 comprising the rubber-like elastic body which is installed at the outer circumference of the after-mentioned cable core 11 (refer to FIG. 2), and the metal fitting 3 which surrounds the cable core 11 and is provided integrally at the low-voltage side of the stress-relief cone 2, and shows the cylindrical shape totally. In this embodiment, the total length of the metal fitting integration type stress-relief cone 1 is about 405 mm, and the outer diameter of the stress-relief cone 2 is about 180 mm, besides, the inner diameter of the insertion hole 4 which is provided at the center of the stress-relief cone 2 is about 64 mm.

The stress-relief cone 2 is provided with the cylindrical semi-conducting body part 5 which is arranged at the low-voltage side and consists of the rubber-like elastic body such as the silicone rubber, the cylindrical insulating body part 6 whose end of the low-voltage side is provided concentrically and continuously to the semi-conducting body part 5 at the high-voltage side of the semi-conducting body part 5 and consists of the rubber-like elastic body such as the silicone rubber, and the cylindrical insulation protective layer 7 which is provided continuously at the end of the low-voltage side of the insulating body part 6 and integrally at the outer circumference of the semi-conducting body part 5 and consists of the rubber-like elastic body such as the silicone rubber, and these semi-conducting body part 5, insulating body part 6 and insulation protective layer 7 are integrated with the aftermentioned metal fitting 3 by molding.

In the end of the high-voltage side of the semi-conducting body part 5, the electric-field stress-control part 51 having the bell-mouthed curved, interface whose diameter expands gently from the inner circumference part (the rising part) of the neighborhood of the end of the high-voltage side of the semi-conducting body part 5 toward the outer circumference part of the end of the high-voltage side of the insulating body part 6 is provided, and, in the outer edge of the end of the low-voltage side, the cylindrical semi-conducting skirt part 8 is protruded toward the low-voltage side and provided concentrically to the semi-conducting body part 5. This semi-conducting body part 5 and the semi-conducting skirt part 8 are formed integrally. In the embodiment, the length of the axial direction of the semi-conducting body part 5 including the semi-conducting skirt part 8 is about 180 mm, the outer diameter is about 156 mm, and of them, the length of the axial direction of the semi-conducting skirt part 8 is about 40 mm. And, in the neighborhood of the rising part of the semi-conducting body part 5, the stress-relief cone 2 has the thickness which can make the sufficient tightening force operate to the interface with the cable core 11 (refer to FIG. 2).

In the outer circumference of the end of the high-voltage side of the insulating body part 6, the conical outer surface 61 whose diameter reduces gently toward the end of the high-voltage side is provided, and, in the inner edge of the end of the high-voltage side, the tulip-shaped depressed part 62 having the inner surface whose diameter expands gently from the neighborhood of the end of the high-voltage side toward the end of the high-voltage side is provided concentrically to the insulating body part 6. By providing such the depressed part 62, the electric-field concentration in the triple junction P of the insulating fluid 15 (refer to FIG. 2) in the end of the high-voltage side of the stress-relief cone 2, the insulating body part 6 of the stress-relief cone 2, and the cable insulator 11b (refer to FIG. 2) of the cable core 11 (refer to FIG. 2) can be prevented. In this embodiment, the depth of the depressed part 62 is about 60 mm, the bore diameter of the small diameter part of the depressed part 62 is about 80 mm, and the bore diameter of the large diameter part is about 120 mm. And, the outer diameter of the insulating body part 6 including the insulation protective layer 7 including the insulating skirt part 9 is about 180 mm, and the length of the axial direction including the insulation protective layer 7 including the insulating skirt part 9 is about 370 mm.

In addition, in the end of the low-voltage side of the insulation protective layer 7, the cylindrical insulating skirt part 9 is protruded toward the low-voltage side and provided concentrically to the insulation protective layer 7. This insulation protective layer 7 and cylindrical insulating skirt part 9 are formed integrally. Here, the insulating skirt part 9 is provided integrally at the outer circumference of the semi-conducting skirt part 8, and the end of the low-voltage side of the insulating skirt part 9 is extended toward the lower-voltage side than the end of the low-voltage side of the semi-conducting skirt part 8, and, the annular protrusion 91 is provided at the inner circumference of the extended end of the low-voltage side of the insulating skirt part 9. In this embodiment, the length of the axial direction of the insulating skirt part 9 is about double of that of the semi-conducting skirt part 8. And, the thickness of the insulating skirt part 9 is about double of the thickness of the semi-conducting skirt part 8.

The metal fitting 3 is provided with the first cylindrical part 31 whose outer circumference part adheres tightly to the inner circumference part of the semi-conducting skirt part 8, the second cylindrical part 32 which is provided concentrically and continuously to the low-voltage side of the first cylindrical part 31 and whose outer circumference part adheres tightly to the inner circumference part of the insulating skirt part 9, and the third cylindrical part 33 which is provided concentrically and continuously to the low-voltage side of the second cylindrical part 32 and has the flange 33a at the outer circumference of the end of the low-voltage side, and the inner surfaces of the first cylindrical part 31, the second cylindrical part 32 and the third cylindrical part 33 are same surface. Besides, the outer diameter of the first cylindrical part 31 is smaller than the outer diameter of the second cylindrical part 32, and the annular concave groove 32a which engages with the annular protrusion 91 is provided at the end of the low-voltage side of the second cylindrical part 32. In this embodiment, the metal fitting 3 is formed by aluminum, and the outer diameter of the flange 33a is about 195 mm, and the inner diameter of the metal fitting 3 is about 136 mm.

The metal fitting integration type stress-relief cone 1 which is provided with such stress-relief cone 2 and metal fitting 3 is formed as follows. First, the semi-conducting rubber part of the stress-relief cone 2, that is, the semi-conducting body part 5 and the semi-conducting skirt part 8, is formed by molding, and the molded semi-conducting rubber part (the semi-conducting body part 5 and the semi-conducting skirt part 8) is fitted in the metal fitting 3. In this case, the inner circumference part of the semi-conducting skirt part 8 and the outer circumference part of the first cylindrical part 31 are contacted. And, the integrated semi-conducting rubber part (the semi-conducting body part 5 and the semi-conducting skirt part 8) and the metal fitting 3 are set to the mold, and the insulating rubber part, that is, the insulating body part 6, the insulation protective layer 7 and the insulating skirt part 9, of the stress-relief cone 2 is formed by molding. Herewith, the metal fitting integration type stress-relief cone 1 that the metal fitting 3 is provided integrally at the low-voltage side of the stress-relief cone 2 can be obtained. Concretely, the outer circumference part of the first cylindrical part 31 of the metal fitting 3 is contacted to the inner circumference part of the semi-conducting skirt part 8 of the stress-relief cone 2 and the outer circumference part of the second cylindrical part 32 of the metal fitting 3 is contacted to the inner circumference part of the insulating skirt part 9 of the stress-relief cone 2 respectively, and the metal fitting integration type stress-relief cone 1 that the protrusion 91 of the insulating skirt part 9 of the stress-relief cone 2 is fitted in the concave groove 32a of the second cylindrical part 32 of the metal fitting 3 can be obtained.

As described above, according to the metal fitting integration type stress-relief cone of this invention, there are following effects.

First, by providing integrally the metal fitting at the low voltage side of the stress-relief cone 2 comprising the rubber-like elastic body, the O-ring 17 can be arranged at the sealing surface (the sealing surface between the metal fitting 3 and after-mentioned lower metal fitting 13 of the porcelain bushing 14). Therefore, the sealing part (oil-stopping part) can be formed easily without using the metal fitting or the sealing tape which are used only for the oil-stopping as before.

Second, by providing integrally the cylindrical insulation protective layer 7 at the outer circumference of the semi-conducting body part 5 of the stress-relief cone 2, because the insulating oil as the insulating fluid 15 (refer to FIG. 2) which is filled in the inside of the porcelain bushing 14 does not contact to the semi-conducting body part 5 of the stress-relief cone 2, there is not a fear that the physical property of the semi-conducting body part 5 is influenced.

Third, by providing the depressed part 62 at the inner edge of the end of the high-voltage side of the insulating body part 6 of the stress-relief cone 2, the electric-field concentration in the triple junction P of the insulating fluid 15 in the end of the high-voltage side of the stress-relief cone 2, the insulating body part 6 of the stress-relief cone 2, and the cable insulator 11b (refer to FIG. 2) of the cable core 11 (refer to FIG. 2) can be prevented.

Fourth, by protruding the semi-conducting skirt part 8 and the insulating skirt part 9 and providing them at the low-voltage side of the stress-relief cone 2, and by providing the first to third cylindrical parts 31, 32, 33 at the metal fitting 3, the metal fitting 3 and the stress-relief cone 2 can be integrated strongly.

Fifth, by providing the annular protrusion 91 at the inner circumference of the end of the low-voltage side of the insulating skirt part 9 which constructs the stress-relief cone 2, and by providing the annular concave groove 32a which engages with the aforementioned protrusion 91 at the end of the low-voltage side of the second cylindrical part 32 which constructs the metal fitting 3, the metal fitting 3 and the stress-relief cone 2 can be integrated more strongly.

[Embodiment 2]

Next, the cable sealing end in this invention is explained.

Figure 2:
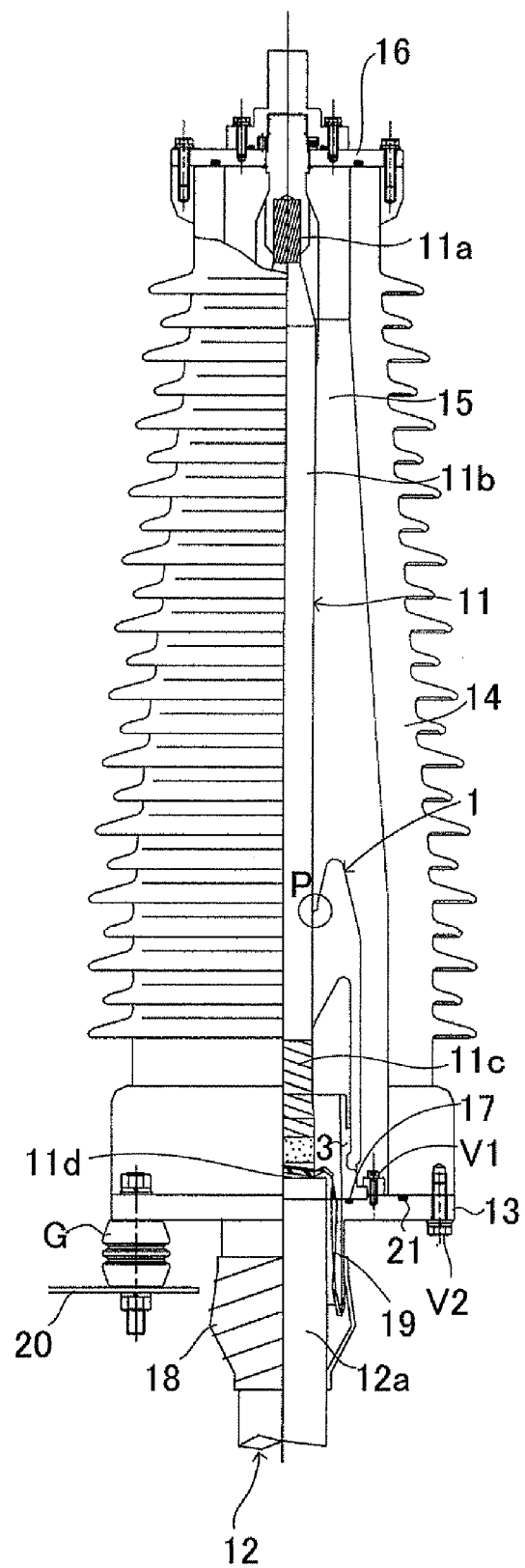
FIG. 2 The partial sectional view of the cable sealing end in this invention.

FIG. 2 shows the partial sectional view of the indoor/outdoor termination of 110 kV class using the metal fitting integration type stress-relief cone 1 of this invention. Meanwhile, in this drawing, the same numerals are given to the portions which are common to FIG. 1, and detailed explanation is omitted.

In FIG. 2, the cable sealing end of this invention is provided with the cable termination 12 whose cable core 11 is exposed by the step-stripped process, the porcelain bushing 14 which surrounds the cable termination 12, the insulating fluid 15 which is filled in the inside of the porcelain bushing 14, and the metal fitting integration type stress-relief cone 1 shown in embodiment 1.

The cable sealing end of such a constitution is assembled as follows.

First, the annular lower metal fitting 13 is fixed through the supporting insulator G and so on at the neighborhood of the end of the cable sheath 12a of the cable termination 12. Next, the metal fitting integration type stress-relief cone 1 is installed at the outer circumference of the cable core 11 from its upper end. In this case, the metal fitting 3 of the metal fitting integration type stress-relief cone 1 is installed toward the lower metal fitting 13 side, and the lower surface of the aforementioned metal fitting 3 is contacted to the upper surface of the lower metal fitting 13 through the O-ring 17, and both are fixed by the bolt V1. Herewith, the sealing part (oil-stopping part) is formed.

Second, the cable termination 12 is surrounded by the porcelain bushing 14 and its end of the low-voltage side is put on the lower metal fitting 13, and both are fixed by the bolts V2, and the insulating fluid 15 such as silicone oil, mineral oil, or synthetic oil is filled in the inside of the porcelain bushing 14. Herewith, the electric insulating performance of the space of the inside of the porcelain bushing 14 is ensured. Next, by installing the upper metal fitting 16 at the upper part of the porcelain bushing 14, and by forming the corrosion proof layer 18 at the end of the low-voltage side of the cable termination 12, the assembling of the cable sealing end is completed. Meanwhile, in FIG. 2, numeral 11a shows the cable conductor, 11b shows the cable insulator, 11c shows the semi-conducting layer of the cable, 11d shows the shielding layer of the cable, 19 shows the earthing wire, 20 shows the trestle, and 21 shows the O-ring.

As described above, according to the cable sealing end using the metal fitting integration type stress-relief cone of this invention, there are following effects.

First, by installing the metal fitting 3 of the metal fitting integration type stress-relief cone 1 toward the lower metal fitting 13 side, and by fixing the aforementioned metal fitting 3 to the lower metal fitting 13 through the O-ring 17, it is possible to reduce the number of the components than the hitherto known sealing part (oil-stopping part), and it is possible to considerably improve the sealing characteristic of the sealing part (oil-stopping part).

Second, because the use of the metal fitting or the tape seal which are used only for the oil-stopping are not necessary as before and the skill of the worker is not necessary, there is not the dispersion of the airtightness in the sealing part, and the simplification of the assembling can be attempted.

Third, by the construction of the sealing by the O-ring, the reliability of the sealing part can be considerably improved.

[Embodiment 3]

Next, the cable sealing end concerning other embodiment of this invention is explained.

Figure 3:
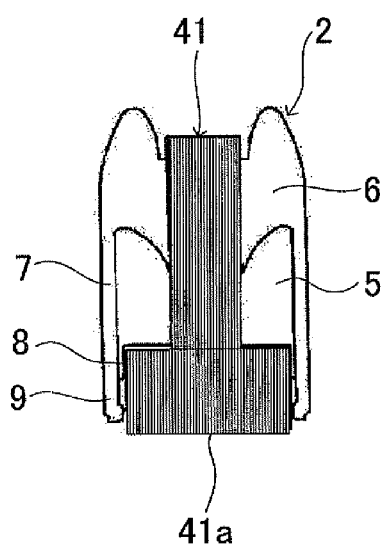
FIG. 3 The explanation view which shows the assembling state of the sealing end concerning other embodiment of this invention. The partial view (a) is the explanation view which shows the stress-relief cone in the state that the diameter expansion holding member was installed and the diameter was expanded. The partial view (b) is the explanation view which shows the installed state of the stress-relief cone in the state that the diameter was expanded.
Figure 3:
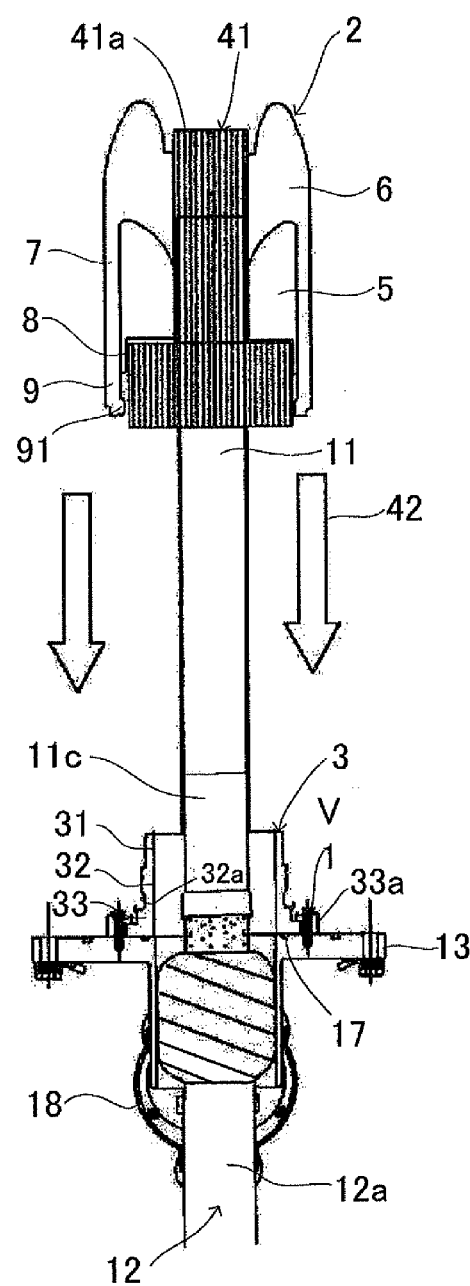

FIG. 3 is the explanation view which shows the state of the assembling of the indoor/outdoor termination of 110 kV class concerning other embodiment of this invention. Meanwhile, in this drawing, the same numerals are given to the portions which are common to FIG. 1 and FIG. 2, and detailed explanation is omitted.

In this embodiment, as shown in FIG. 3(a), the semi-conducting body part 5, the insulating body part 6, the insulation protective layer 7, the semi-conducting skirt part 8 and the insulating skirt part 9 which construct the stress-relief cone 2 which is shown in FIG. 1 are preliminarily integrated by molding in the factory. Meanwhile, the stress-relief cone 2 which is formed by the rubber-like elastic body has the cold shrinkable property.

Besides, in the inner circumference side of the cylindrical stress-relief cone 2 which is formed in this way, the cylindrical diameter expansion holding member 41 which supports the aforementioned stress-relief cone 2 in the state of diameter expansion is installed. The diameter expansion holding member 41 is formed by the thing which is winding spirally the belt-like member 41a which consists of the synthetic resin of the polypropylene and so on, for example. Meanwhile, the belt-like member 41a is coupled so that it can exfoliate in the width direction. Therefore, by covering the stress-relief cone 2, whose diameter is expanded on the outer circumference of cylindrical diameter expansion holding member 41 like this, the stress-relief cone 2 can be supported in predefined inner diameter. Here, the inner diameter of the part corresponding to the cable core 11 of the diameter expansion holding member 41 is larger than the outer diameter of the cable core 11, and the inner diameter of the part corresponding to the metal fitting 3 is larger than the outer diameter of the metal fitting 3.

The stress-relief cone 2 whose diameter is expanded is installed at the outer circumference of the cable core 11 and the metal fitting 3 as described below.

First, as shown in FIG. 3(b), the lower surface of the flange 33a of the metal fitting 3 is contacted to the upper surface of the lower metal fitting 13 through the O-ring 17, and both are fixed by a number of bolts V1. Meanwhile, in the stress-relief cone 2 whose diameter is expanded by the diameter expansion holding member 41, as shown in arrowed line 42, the semi-conducting body part 5 side of the stress-relief cone 2 is arranged at the predefined place toward the metal fitting 3 side. Concretely, it is arranged so that the inner circumferences of the semi-conducting skirt part 8 and the insulating skirt part 9 of the stress-relief cone 2 correspond to the outer circumference of the metal fitting 3, and so that the inner circumferences of the semi-conducting body part 5 and the insulating body part 6 of the stress-relief cone 2 correspond to the outer circumference of the cable core 11. Second, the belt-like member 41a which consists of the diameter expansion holding member 41 is inserted from its one end side (lower part in drawing) in the inside of the diameter expansion holding member 41 and is lead to another end side (upper part in drawing), and by being drawn out of another end side, the belt-like member 41a which is coupled in width direction is exfoliated in sequence, and herewith, the diameter expansion holding member 41 which is formed spirally is demolished, and consequently, the stress-relief cone 2 is installed at the predefined place closely. Concretely, the inner circumference of the semi-conducting skirt part 8 of the stress-relief cone 2 is installed at the outer circumference of the first cylindrical part 31 of the metal fitting 3 and the inner circumference of the insulating skirt part 9 is installed at the outer circumference of the second cylindrical part 32 of the metal fitting 3, respectively and closely, and the annular protrusion 91 is engaged with the annular concave groove 32a, besides, the inner circumferences of the semi-conducting body part 5 and the insulating body part 6 of the stress-relief cone 2 are installed at the outer circumference of the cable core 11, respectively and closely. Meanwhile, the state after installing is same as FIG. 2.

Also in this embodiment, it is possible to show the effect similar to second embodiment, besides, by expanding the diameter of the stress-relief cone 2 and by holding the stress-relief cone 2, the stress-relief cone 2 can be installed closely at the outer circumference of the metal fitting 3 or the outer circumference of the cable core 11 on site.

Industrial Applicability

In the aforementioned embodiment, although this invention is explained by the particular embodiments shown in drawing, this invention is not limited to these embodiments, and, as long as the effect of this invention is shown, it is possible to compose as follows.

First, in the aforementioned embodiment, although the semi-conducting skirt part 8 and the insulating skirt part 9 are provided at the low-voltage side of the stress-relief cone 2, and the metal fitting 3 having first to third cylindrical parts is integrated by utilizing these semi-conducting skirt part 8 and insulating skirt part 9, for example, the annular metal plate may be fixed concentrically at the end face of the low-voltage side of the semi-conducting body part 5 which has the composition that these semi-conducting skirt part 8 and insulating skirt part 9 are not provided at the low-voltage side of the stress-relief cone 2.

Second, in the aforementioned embodiment, although the case that the stress-relief cone is formed by the silicone rubber is explained, for example, the stress-relief cone may be formed by such as ethylene-propylene rubber.

Third, in the aforementioned embodiment, although the case filling the insulating oil in the inside of the porcelain bushing is explained, the insulating gas such as $SF_6$ gas instead of the insulating oil may be filled.

Fourth, in the aforementioned embodiment, although the case applying the indoor/outdoor termination is explained, the gas immersed sealing end or the oil immersed sealing end may be applied.

Fifth, in the aforementioned embodiment, although the one that the application voltage is 110 kV class is explained, the lower voltage or the higher voltage than 110 kV may apply.

The invention claimed is:

1. A metal fitting integration type stress-relief cone, comprising:
    a stress-relief cone which is installed at an outer circumference of a cable core and includes a rubber-like elastic body and a metal fitting which surrounds said cable core and is provided integrally at a low-voltage side of said stress-relief cone,
    wherein said stress-relief cone is provided with a cylindrical semi-conducting body part which is arranged at the low-voltage side and has a bell-mouthed electric-field stress-control part at an end of a high-voltage side, a cylindrical insulating body part which is arranged at the high-voltage side and whose end of the low-voltage side, which surrounds and directly contacts said bell-mouthed electric-field stress-control part, and which is concentric with said cylindrical semi-conducting body part, and a cylindrical insulation protective layer which is provided integrally with the end of the low-voltage side of said cylindrical insulating body part, surrounding and in direct contact with the outer circumference of said cylindrical semi-conducting body part,
    a cylindrical semi-conducting skirt part is protruded and provided toward the low-voltage side at an outer edge of the end of the low-voltage side of said cylindrical semi-conducting body part,
    an insulating skirt part is protruded and provided toward the low-voltage side at the end of the low-voltage side of said cylindrical insulation protective layer, and
    said metal fitting is provided with a first cylindrical part whose outer circumference part directly adheres tightly to an inner circumference part of said cylindrical semi-conducting skirt part, a second cylindrical part which is provided concentrically and integrally with the low-voltage side of said first cylindrical part and whose outer circumference part directly adheres tightly to the inner circumference part of said insulating skirt part, and a third cylindrical part which is provided concentrically and integrally with the low-voltage side of said second cylindrical part.

2. The metal fitting integration type stress-relief cone according to claim 1, wherein
    an annular protrusion is provided at an inner circumference of the end of the low-voltage side of said insulating skirt part, and
    an annular concave groove, which is engaged with said protrusion located therein, is provided in said second cylindrical part of said metal fitting, at the end of the low-voltage side of said second cylindrical part.

3. The metal fitting integration type stress-relief cone according to claim 2, wherein
    a depression is provided in the end of the high-voltage side of said cylindrical insulating body part, concentric with said cylindrical insulating body part.

4. A cable sealing end, comprising:
    a cable termination whose cable core is exposed by a step-stripped process, a porcelain bushing which surrounds said cable termination, an insulating fluid which is filled in the inside of said porcelain bushing, and the metal fitting integration type stress-relief cone according to claim 3,
    wherein said metal fitting integration type stress-relief cone installs the metal fitting of said metal fitting integration type stress-relief cone toward a lower metal fitting of said porcelain bushing at an outer circumference of said cable core, and said metal fitting is fixed to said lower metal fitting through an O-ring.

5. The metal fitting integration type stress-relief cone according to claim 1, wherein
a depression is provided concentric with said cylindrical insulating body part at an inner edge of the end of the high-voltage side of said cylindrical insulating body part.

6. A cable sealing end, comprising:
a cable termination whose cable core is exposed by a step-stripped process, a porcelain bushing which surrounds said cable termination, an insulating fluid which is filled in the inside of said porcelain bushing, and the metal fitting integration type stress-relief cone according to claim 5,
wherein said metal fitting integration type stress-relief cone installs the metal fitting of said metal fitting integration type stress-relief cone toward a lower metal fitting of said porcelain bushing at an outer circumference of said cable core, and
said metal fitting is fixed to said lower metal fitting through an O-ring.

7. A cable sealing end, comprising:
a cable termination whose cable core is exposed by a step-stripped process, a porcelain bushing which surrounds said cable termination, an insulating fluid which is filled in the inside of said porcelain bushing, and the metal fitting integration type stress-relief cone according to claim 1,
wherein said metal fitting integration type stress-relief cone installs the metal fitting of said metal fitting integration type stress-relief cone toward a lower metal fitting of said porcelain bushing at an outer circumference of said cable core, and
said metal fitting is fixed to said lower metal fitting through an O-ring.

8. A cable sealing end, comprising:
a cable termination whose cable core is exposed by a step-stripped process, a porcelain bushing which surrounds said cable termination, an insulating fluid which is filled in the inside of said porcelain bushing, and the metal fitting integration type stress-relief cone according to claim 2,
wherein said metal fitting integration type stress-relief cone installs the metal fitting of said metal fitting integration type stress-relief cone toward a lower metal fitting of said porcelain bushing at an outer circumference of said cable core, and
said metal fitting is fixed to said lower metal fitting through an O-ring.

* * * * *